United States Patent [19]

Post et al.

[11] Patent Number: 5,172,889
[45] Date of Patent: Dec. 22, 1992

[54] STRUT SPRING COMPRESSION TOOL

[75] Inventors: Steven W. Post, Jonesboro, Ark.;
Gregory Law, Edwardsville, Ill.

[73] Assignee: Lincoln, St. Louis, Mo.

[21] Appl. No.: 821,700

[22] Filed: Jan. 16, 1992

[51] Int. Cl.5 .............................................. B23P 19/04
[52] U.S. Cl. ...................................... 254/10.5; 29/227
[58] Field of Search ................. 254/10.5; 29/225-227; 29/259, 215-218

[56] References Cited

U.S. PATENT DOCUMENTS 3,902,236  9/1975  Deem ................................... 29/259
3,912,224 10/1975  Castoe ................................ 254/10.5

FOREIGN PATENT DOCUMENTS 2525458 12/1976  Fed. Rep. of Germany ........ 29/227

Primary Examiner—Robert C. Watson
Attorney, Agent, or Firm—Rogers, Howell & Haferkamp

[57] ABSTRACT

An improved strut spring compression tool is provided having a load screw that extends between pairs of arms that are engaged with spaced coils of a strut spring to be compressed. The improved load screw is provided with a stop block formed unitarily thereon. The stop block serves as a limit stop that prevents further adjustment of the arms of the spring compression tool toward each other that could potentially result in damage to the component parts of the strut spring compression tool.

13 Claims, 1 Drawing Sheet

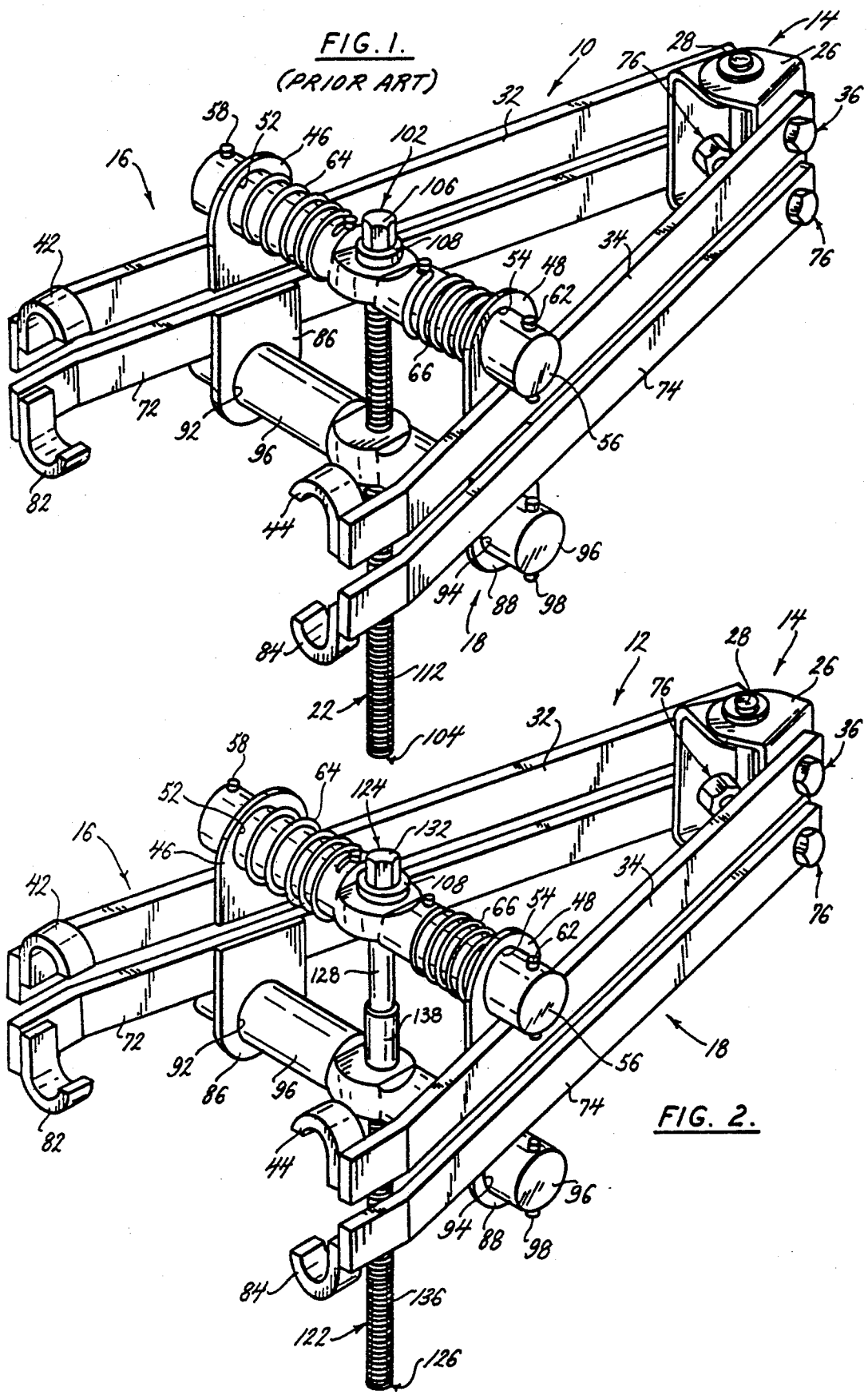

STRUT SPRING COMPRESSION TOOL

BACKGROUND OF THE INVENTION (1) Field of the Invention

The present invention pertains to an improved strut spring compression tool employed in compressing coiled springs of shock absorbing struts for installation or removal of the struts in and from machinery. In particular, the present invention pertains to an improved strut spring compression tool having a load screw for adjusting the tool to compress a strut spring, where the load screw is provided with a stop block on the screw that limits the extent that a strut spring may be compressed by the tool, and thereby prevents inadvertent damage from being caused to the tool during use.

(2) Description of the Related Art

Strut spring compression tools of the prior art are typically comprised of pairs of arms that are attached to opposite sides of spaced coils of a strut spring and are then adjusted toward each other to compress the spaced coils of the spring. The arms of each pair of arms are provided with hooks at one end that engage over opposite sides of spaced spring coils. The opposite ends of the arms from the hooks are pivotally connected to a base member of the tool. A bearing cross head and a threaded cross head span the space between the arms of each pair, and a load screw extends between the cross heads associated with each pair of arms. One end of the load screw is mounted for rotation on the bearing cross head and the screw thread of the load screw is threaded through a complementary internal screw threaded bore provided in the threaded cross head.

By rotating the load screw in opposite directions of rotation, the two cross heads are adjusted toward and away from each other and the two pairs of arms associated with each cross head are likewise adjusted toward and away from each other. In this manner, spaced coils of a strut spring may be compressed toward each other by turning the load screw in a direction that adjusts the cross heads of the tool toward each other. The compressed spring may then be allowed to expand to its at rest configuration by rotating the load screw in the opposite direction and adjusting the relative positions of the cross heads away from each other.

In prior art strut spring compression tools, it is possible for adjacent coils of a strut spring being compressed to engage against each other, or for the pairs of arms of the tool attached to the coils of the spring to engage against each other, while turning the load screw to compress the strut spring. With adjacent coils of the spring engaged against each other, or with the pairs of arms of the tool engaged against each other, any continued turning of the load screw can result in damage to the strut spring compression tool in the form of bending of the cross heads spanning the pairs of arms or in the arms themselves being bent.

What is needed to overcome this disadvantage of prior art strut spring compression tools is an improved strut spring compression tool that is adjustable to compress the coils of a strut spring to a set degree of compression beyond which further compression is prevented, thereby avoiding exerting any potentially damaging forces on the arms or the cross heads of the tool.

SUMMARY OF THE INVENTION

The improved strut spring compression tool of the present invention overcomes the disadvantages of prior art strut spring compression tools by providing an improved load screw that has a stop block formed thereon, where the stop block limits the adjustment of the pairs of coil engaging arms of the tool toward each other. By providing the stop block on the load screw, turning the load screw to compress a strut spring allows the spring to be compressed to an extent where adjacent coils of the spring are about to engage each other, and where the pairs of arms of the tool are about to engage each other. At this point of adjustment, the stop block on the load screw of the present invention engages against the threaded cross head of the tool through which the load screw is threaded. The engagement of the stop block against the cross head prevents any further adjustment of the two cross heads toward each other and thereby prevents any further adjustment of the pairs of spring coil engaging arms toward each other. The engagement of the stop block against the cross head also prevents further turning of the load screw and thereby prevents excessive forces from pulling the two cross heads toward each other and bending the cross heads, and also prevents bending the arms of the tool.

BRIEF DESCRIPTION OF THE DRAWINGS

Further objects and features of the present invention are revealed in the following detailed description of the preferred embodiment of the invention and in the drawing figures wherein:

FIG. 1 is a perspective view of a prior art strut spring compression tool; and

FIG. 2 is a perspective view of the improved strut spring compression tool of the present invention.

DESCRIPTION OF THE PREFERRED EMBODIMENT

FIG. 1 shows a typical prior art strut spring compression tool 10 over which the strut spring compression tool 12 of the present invention is an improvement. The prior art tool of FIG. 1 is basically comprised of a base 14, an upper arm assembly 16, a lower arm assembly 18, and a load screw 22 connected between the upper and lower arm assemblies. The entire prior art tool is constructed of metal.

The base 14 of the prior art tool is comprised of left and right U-shaped base members 24, 26. The U-shaped members are interconnected by a pivot pin 28 that extends through both U-shaped members as seen in FIG. 1, and connects the U-shaped members for pivoting movement about a vertical axis extending through the center of the pin.

The upper arm assembly 16 is comprised of a left arm 32 and right arm 34 connected to the right and left U-shaped members of the base 14, respectively. First ends of the left and right arms 32, 34 are pivotally connected to the respective left and right U-shaped members 24, 26 by nut and bolt fasteners 36 (only one of which is visible in FIG. 1). The connection of the left and right arms 32, 34 to the left and right U-shaped members 24, 26 by the nut and bolt fasteners 36 enables both the left and right arms to pivot relative to the left and right U-shaped members about a horizontal axis extending through the centers of the nut and bolt fasteners 36. A pair of hooks 42, 44 are provided at the distal ends of the left and right arms 32, 34 from their pivoting connection to the base 14. The left and right hooks 42, 44 of the upper arms mutually oppose each other and are configured to be hooked over opposite sides of a coil of a strut spring to compress the spring using the prior art tool 10. Left and right flanges 46, 48 are secured to the respective left and right arms 32, 34 at intermediate positions along the arms between the hooks and the pivoting connections of the arms to the base. As seen in FIG. 1, the left and right flanges 46, 48 are secured to mutually opposed interior surfaces of the left and right arms 32, 34 and extend slightly above the arms. Holes 52, 54 are provided in the left and right flanges 46, 48. A bearing cross head 56 spans across the left and right arms 32, 34 and projects through the holes 52, 54 of the left and right flanges. Pins 58, 62 are inserted through the left and right ends of the bearing cross head 56 to prevent the opposite ends of the bearing cross head from being removed from the holes 52, 54. Left and right screw threads 64, 66 are provided on the exterior surface of the left and right ends of the bearing cross head 56 and engage through a slot (not shown) in the holes 52, 54 of the left and right flanges. The left and right springs 64, 66 are provided on the bearing cross head 56 to spring load the positions of the left and right arms 32, 34 away from each other. A bearing hole (not shown) is provided through the center of the bearing cross head 56 and extends through the cross head in a transverse direction relative to the axis of the cross head.

The construction of the lower arm assembly 18 is substantially identical to that of the upper arm assembly 16. The lower arm assembly includes left and right lower arms 72, 74 connected to the base 14 of the tool. The first ends of the left and right lower arms 72, 74 are connected to lower ends of the left and right U-shaped members 24, 26 by nut and bolt fasteners 76. The connection of the lower arms 72, 74 to the U-shaped members 24, 26 by the nut and bolt fasteners 76 enables the arms to pivot relative to the base 14 about the horizontal axes of the two fasteners 76. Left and right hooks 82, 84 are provided at the distal ends of the left and right lower arms 72, 74 from their pivot connections to the base 14. The left and right hooks 82, 84 are configured to engage underneath opposite sides of a coil of a strut spring to be compressed by the tool 10. Left and right flanges 86, 88 are secured to the mutually opposed interior surfaces of the left and right lower arms 72, 74 at positions intermediate the hooks 82, 84 and the pivot connections of the arms to the base 14. Left and right holes 92, 94 are provided in the left and right flanges 86, 88 respectively. Opposite ends of a threaded cross head 96 positioned between the left and right arms 72, 74 project through the respective left and right holes 92, 94. Pins 98 (only one of which is visible in FIG. 1) are provided through the opposite left and right ends of the threaded cross head 96 to prevent the opposite ends of the cross head from being pulled out through the left and right holes 92, 94 of the flanges. A threaded bore hole (not shown) extends through the center of the threaded cross head 96. The threaded bore hole has an axis that is transverse to the center axis of the threaded cross head 96.

The load screw 22 extends between the bearing cross head 56 and the threaded cross head 96 as seen in FIG. 1. The load screw 22 has opposite first and second ends 102, 104 and has a journalled portion (not shown) adjacent to its first end 102. The journalled portion of the load screw 22 is received in the center bore (not shown) of the bearing cross head 56. A hexagon shaped head 106 is formed on the first end 102 of the load screw. A thrust bearing 108 is provided under the hexagon head to reduce torsional friction. The hexagon head 106 is provided to be engaged by a conventional impact wrench or other type of wrench to turn the load screw 22 in opposite directions of rotation about its center axis. The journalled portion of the load screw 22 extending through the center bore of the bearing cross head 56 enables the load screw to be freely rotated in both directions of rotation relative to the bearing cross head 56. The hexagon head 106 of the load screw prevents the load screw from being pulled through the center bore of the bearing cross head 56.

A screw thread 112 is formed on the exterior of the load screw 22. The screw thread extends from the second end 104 of the load screw to the journal (not shown) formed on the load screw adjacent its first end 102. The screw thread 112 is dimensioned to be threaded through the complementary screw threads provided in the internal screw threaded bore (not shown) of the threaded cross head 96.

With the load screw 22 screw threaded through the internal threaded bore of the threaded cross head 96 and secured for rotation in the center bearing bore of the bearing cross head 56, rotation of the load screw in opposite directions of rotation causes the bearing cross head 56 and threaded cross head 96 to be selectively moved toward and away from each other. For example, employing an impact wrench or other type of wrench to turn the hexagon head 106 of the load screw in a clockwise direction of rotation screws the screw threads 112 of the load screw through the internal threaded bore of the threaded cross head 96 and causes the threaded cross head to move along the axial length of the load screw toward the bearing cross head 56. Turning the hexagon head 106 in the opposite, counterclockwise direction of rotation turns the screw threads 112 of the load screw through the internal threaded bore of the threaded cross head 96 and causes the threaded cross head to move axially along the load screw away from the bearing cross head 56. In this manner, the pair of upper arms 32, 34 and the pair of lower arms 72, 74 are selectively adjusted toward and away from each other. With the hooks 42, 44 of the upper arms and the hooks 82, 84 of the lower arms engaged over spaced coils of a strut spring, turning the load screw 22 in a clockwise direction to adjust the threaded cross head 96 toward the bearing cross head 56 causes the spring coils engaged by the hooks to be compressed toward each other, thereby compressing the strut spring. Rotating the load screw in the opposite direction causes the spring coils engaged by the hooks to move under the resiliency of the spring away from each other, thereby allowing the strut spring to return to its at rest configuration.

The construction of the improved strut spring compression tool 12 of the present invention shown in FIG. 2 is substantially identical to the prior art tool 10 shown in FIG. 1 except for the specific construction of the load screw 122 of the present invention. Because the remaining component parts of the improved strut spring compression tool 12 of the present invention are identical to the corresponding parts of the prior art tool shown in FIG. 1, these component parts are identified by the same reference numbers employed in the description of the prior art tool shown in FIG. 1 and are not further described herein. The functioning of the improved strut spring compression tool 12 is substantially identical to that of the prior art tool 10 except for the operation of the improved load screw 122 yet to be described.

As seen in FIG. 2, the improved load screw 122 has opposite first and second ends 124, 126 with a journal 128 being provided at the first end of the load screw. The journal 128 is dimensioned to be received in the center bearing bore (not shown) of the bearing cross head 56, thereby mounting the first end of the load screw 122 to the bearing cross head 56 for rotation of the load screw relative to the cross head. A hexagon shaped head 132 is provided at the distal end of the first end of the load screw. The hexagon shaped head 132 is provided to be engaged by a socket of an impact wrench or by a conventional wrench to turn the improved load screw 122 in opposite directions of rotation. The hexagon shaped head 132 is provided at the first end of the improved load screw to prevent the first end of the load screw from being pulled through the center bearing bore (not shown) of the bearing cross head 56.

A screw thread 136 is formed on the exterior of the improved load screw 122 beginning at the second end 126 of the load screw and extending for a predetermined distance along the axial length of the load screw. The axial distance that the screw thread 136 extends over the improved load screw 122 is less than the overall axial length of the load screw and terminates at an intermediate point along the total length of the load screw. The screw thread 136 is dimensioned complementary to the internal screw threaded bore (not shown) of the threaded cross head 96.

A stop block 138 is formed on the load screw 122 intermediate its first and second ends 124, 126 and adjacent the point of termination of the screw thread 136. The stop block 138 is dimensioned larger than the internal screw threaded bore of the threaded cross head 96 and therefore prevents any additional length of the load screw from passing through the internal screw threaded bore once the stop block 138 abuts against the side of the threaded cross head 96 as seen in FIG. 2. In the relative positions of the bearing cross head 56 and the threaded cross head 96 of the improved strut spring compression tool 12 shown in FIG. 2, the bearing cross head 56 is adjusted to its closest position proximate to the threaded cross head 96 and is prevented from being adjusted any closer to the threaded cross head by the engagement of the stop block 138 against the side of the bearing cross head 56.

In operation of the prior art strut spring compression tool shown in FIG. 1, by rotating the load screw head 106 in a clockwise direction the threaded cross head 96 is adjusted along the axial length of the load screw toward the bearing cross head 56. This causes the upper and lower pairs of arms to be adjusted toward each other, and compresses coils of a strut spring attached between the upper and lower pairs of arms. The threaded cross head 96 can be adjusted toward the bearing cross head 56 until adjacent coils of the strut spring engage against each other, or until the pair of upper arms 32, 34 engage against the pair of lower arms 72, 74. When either of these situations occur, additional turning of the load screw 22 in the clockwise direction will not result in any further adjustment of the upper and lower arms toward each other. Continuing to apply a force to the hexagon head 106 of the load screw 22 to turn the load screw in the clockwise direction can result in damage to the prior art tool by causing either or both of the bearing cross head 56 and threaded cross head 96 to be bent towards each other at their center bore holes. Damage to the prior art strut spring compression tool 10 often results when a pneumatic impact wrench is employed to adjust the hexagon head 106 of the load screw. This type of wrench continues to apply a force tending to rotate the load screw in a clockwise direction even after adjacent coils of the spring have engaged against each other or after the upper and lower pairs of arms of the tool have engaged against each other. The pneumatic impact wrench prevents the operator of the wrench from immediately sensing that the prior art strut spring compression tool has compressed the strut spring to its maximum possible extent, and that any further force applied to the load screw could result in damage to the prior art tool.

The improved load screw 122 of the present invention shown in FIG. 2 prevents any inadvertent damage to the improved strut spring compression tool 12 from the use of a pneumatic impact wrench with the tool. While adjusting the bearing cross head 56 and threaded cross head 96 of the improved tool of FIG. 2 toward each other and compressing spaced coils of a strut spring together with the tool, the stop block 138 will engage against the threaded cross head 96 well before adjacent coils of the spring engage against each other or before the pair of upper arms 32, 34 engage against the pair of lower arms 72, 74 of the improved tool. Once the stop block 138 has engaged against the threaded cross head 96, any additional torsion force exerted on the hexagon head 132 of the load screw 122 by an impact wrench or other type of wrench exerts a torsion on the journal portion 128 of the load screw but does not exert any additional force pulling the threaded cross head 96 toward the bearing cross head 56 that could result in bending of either of the two cross heads or arms. In this manner, the improved strut spring compression tool 12 of the present invention provides a tool for compressing the spring of a strut while removing any possibility of inadvertently damaging the compression tool by over tightening the load screw 122 with an impact wrench or other type of wrench.

While the present invention has been described by reference to a specific embodiment, it should be understood that modifications and variations of the invention may be constructed without departing from the scope of the invention defined in the following claims.

What is claimed is:

1. In a spring compression tool having separate arm assemblies for attachment to spaced coils of a spring, and having a load screw connected between the arm assemblies for causing the arm assemblies to be selectively adjusted toward each other in response to rotation of the load screw in a first direction relative to the arm assemblies, and for causing the arm assemblies to be selectively adjusted away from each other in response to rotation of the load screw in a second direction relative to the arm assemblies, an improvement in the tool comprising:
   means provided on the load screw for limiting the proximity within which the arm assemblies are adjusted toward each other in response to rotation of the load screw in the first direction.

2. The tool of claim 1, wherein:
   the means for limiting the proximity within which the arm assemblies are adjusted toward each other includes a stop block secured on the load screw.

3. The tool of claim 2, wherein:

the load screw has a first axial length with opposite first and second ends, a screw thread is formed on the load screw beginning at the second end and extending a second length along the load screw, and the stop block is secured on the load screw intermediate the first and second ends of the load screw and at a termination of the screw threads on the load screw.

4. The tool of claim 3, wherein:
a first one of the arm assemblies includes a bearing cross head, the first end of the load screw is secured to the bearing cross head for rotation of the load screw relative thereto;
a second one of the arm assemblies includes a threaded cross head having an internal screw threaded bore extending therethrough, the screw thread formed on the load screw is threaded through the bore causing the second arm assembly to move axially along the load screw toward the first arm assembly in response to the load screw being rotated in the first direction relative to the arm assemblies, and causing the second arm assembly to move axially along the load screw away from the first arm assembly in response to the load screw being rotated in the second direction relative to the arm assemblies, the threaded cross head engaging against the stop block as the load screw is rotated in the first direction of rotation thereby preventing further axial movement of the second arm assembly toward the first arm assembly.

5. The tool of claim 2, wherein:
the load screw and the stop block are formed unitarily.

6. In a spring compression tool having separate arm assemblies for attachment to separate coils of a strut spring, and having a load screw connected between the arm assemblies for causing the arm assemblies to be adjusted toward each other in response to rotation of the load screw in a first direction, and for causing the arm assemblies to be adjusted away from each other in response to rotation of the load screw in a second direction opposite to the first direction, the improvement comprising:
a stop block secured on the load screw to prevent the arm assemblies from being adjusted toward each other to an extent where they contact and exert a force on each other.

7. The tool of claim 6, wherein:
a first arm assembly includes a bearing cross head having one end of the load screw secured for rotation thereon; a second arm assembly incudes a threaded cross head having a screw threaded length of the load screw threaded therethrough, where rotation of the load screw in the first direction causes the bearing cross head and the threaded cross head to be adjusted toward each other and rotation of the load screw in the second direction causes the bearing cross head and the threaded cross head to be adjusted away from each other, and the stop block is secured on the load screw in a position intermediate the bearing cross head and the threaded cross head to engage with the threaded cross head at a point along the load screw as the threaded cross head is adjusted toward the bearing cross head thereby preventing further adjustment of the threaded cross head toward the bearing cross head.

8. The tool of claim 6, wherein:
the load screw and the stop block are formed unitarily.

9. The tool of claim 6, wherein:
the load screw has a first predetermined length with first and second opposite ends, a journal is provided at the first end of the load screw, the journal is received in a bearing of one of the arm assemblies thereby mounting the first end of the load screw for rotation to the one arm assembly, a screw thread is formed on the load screw at the second end of the load screw, the screw thread extends a second predetermined length over the load screw from the second end, the second length being less than the first length, and the stop block is secured on the load screw intermediate the first and second ends of the load screw and at a termination of the screw thread spaced the second length from the second end of the load screw.

10. A strut spring compression tool comprising:
a base;
a first arm assembly having opposite first and second ends, the first end being pivotally connected to the base and the second end being configured to be attached to a coil of a strut spring;
a second arm assembly having opposite first and second ends, the first end being pivotally connected to the base and the second end being configured to be attached to a coil of a strut spring;
a load screw having a first axial length and opposite first and second ends, the load screw having a screw thread formed thereon beginning at the second end of the load screw and extending a second length along the load screw, the first end of the load screw being mounted for rotation to the first arm assembly and the screw thread of the load screw being screw threaded through the second arm assembly for causing the first ends of the first and second arm assemblies to be adjusted toward each other in response to rotation of the load screw in a first direction, and for causing the first ends of the first and second arm assemblies to be adjusted away from each other in response to rotation of the load screw in a second direction opposite the first direction; and,
a stop block secured on the load screw intermediate the first and second ends of the load screw, the stop block being positioned on the load screw to engage with the second arm assembly as the second arm assembly is adjusted toward the first arm assembly to prevent further adjustment of the second arm assembly toward the first arm assembly.

11. The tool of claim 10, wherein:
the first arm assembly includes a bearing cross head having the first end of the load screw connected thereto, the connection of the load screw first end to the bearing cross head enables rotation of the load screw relative to the bearing cross head while preventing axial movement of the load screw relative to the bearing cross head;
the second arm assembly includes a threaded cross head having an internal screw threaded bore and having the screw thread formed on the load screw received in the bore wherein rotation of the load screw in opposite first and second directions of rotation relative to the threaded cross head causes the threaded cross head to move axially along the load screw toward the bearing cross head and causes the threaded cross head to move axially along the load screw away from the bearing cross head respectively; and the stop block limits the movement of the threaded cross head axially along the load screw toward the bearing cross head.

12. The tool of claim 10, wherein: the load screw and the stop block are formed unitarily.

13. The tool of claim 10, wherein:
the stop block is secured on the load screw at a position at a termination of the screw thread formed on the load screw and spaced the second length along the load screw from the second end of the load screw.

* * * * *